Figure 3:
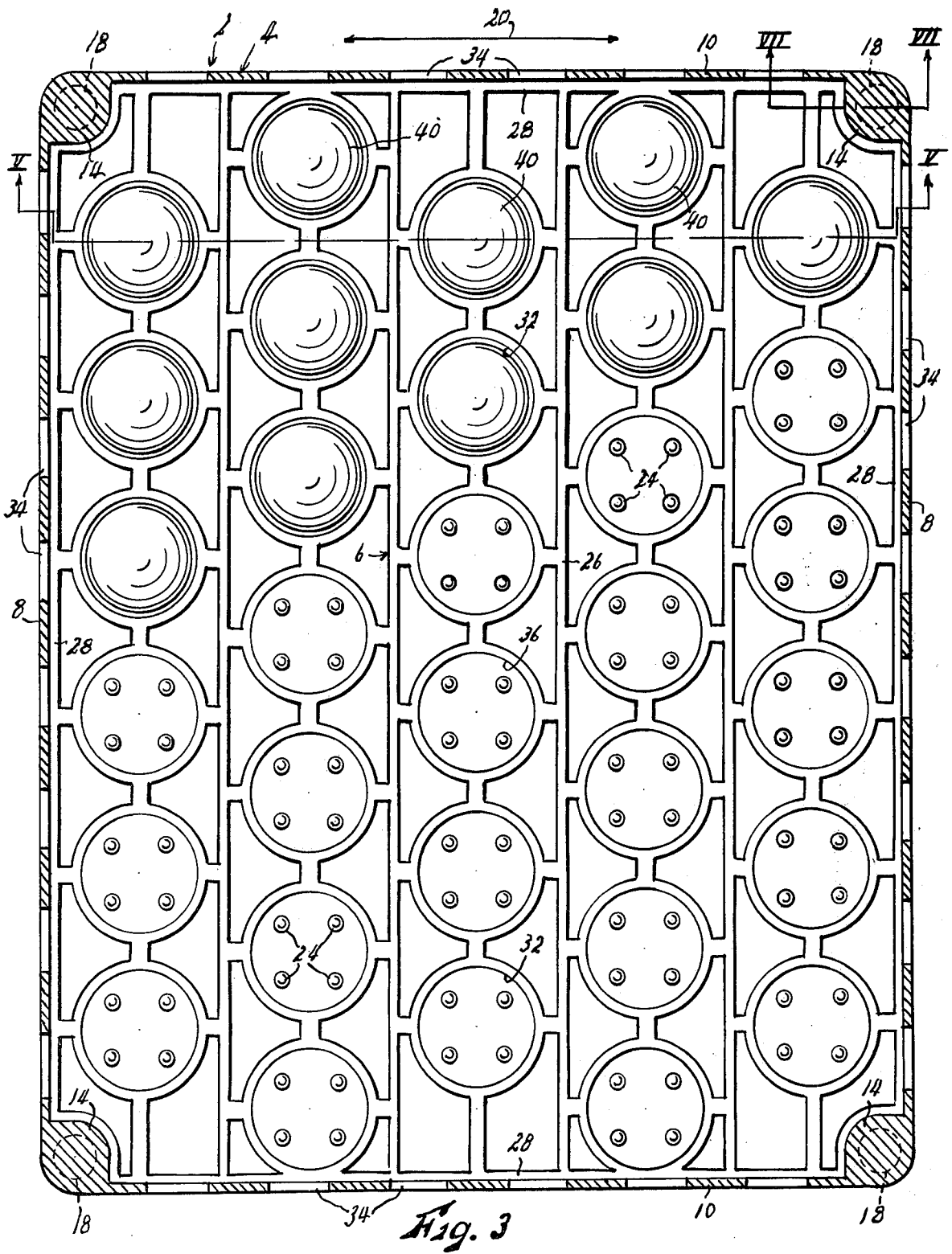

United States Patent [19]

Blakely

[11] 4,398,499

[45] Aug. 16, 1983

[54] POULTRY INCUBATION AND HATCHING TRAY

[76] Inventor: John R. Blakely, Rte. 2-Box 17HH, Ahoskie, N.C. 27910

[21] Appl. No.: 366,144

[22] Filed: Apr. 7, 1982

[51] Int. Cl.³ ............................................ A01K 41/00
[52] U.S. Cl. .................................................... 119/43
[58] Field of Search .................................. 119/43, 44

[56] References Cited

U.S. PATENT DOCUMENTS 2,267,473  12/1941  Markey ................................. 119/43
3,003,463  10/1961  De Rijcke ............................. 119/43

*Primary Examiner*—Hugh R. Chamblee
*Attorney, Agent, or Firm*—John A. Hamilton

[57] ABSTRACT

A tray adapted to contain poultry eggs during both the incubation and hatching thereof, in a continuous operation not requiring removal or handling of the eggs between incubation and hatching, consisting of a tray body of sufficient depth to contain hatched chicks, its floor being divided into compartments each of a size to contain a single egg, loosely, lying on its side, said trays being adapted to be stacked to any desired height, and each tray having a removable cover capable of supporting each egg in a position with its major axis substantially vertical when the tray is inverted. Each egg is movable from its vertical-axis position, which is the incubation position in which development of the embryo occurs, to its horizontal-axis position, in which hatching occurs as the chick pecks its way out of the shell, by simply inverting the stack of trays.

11 Claims, 7 Drawing Figures

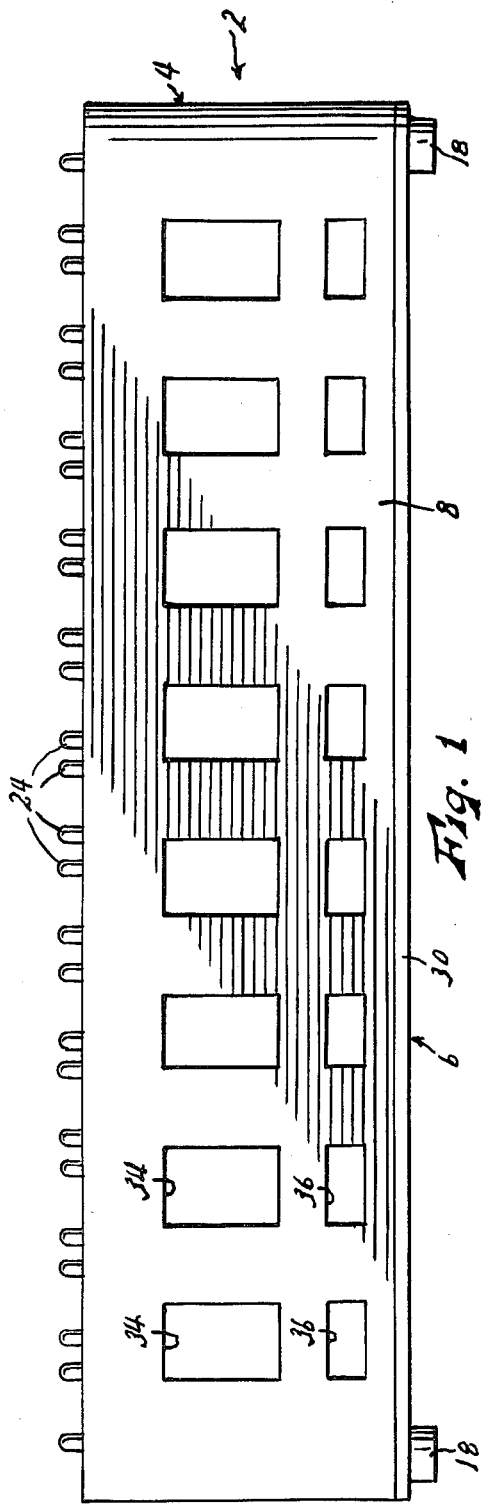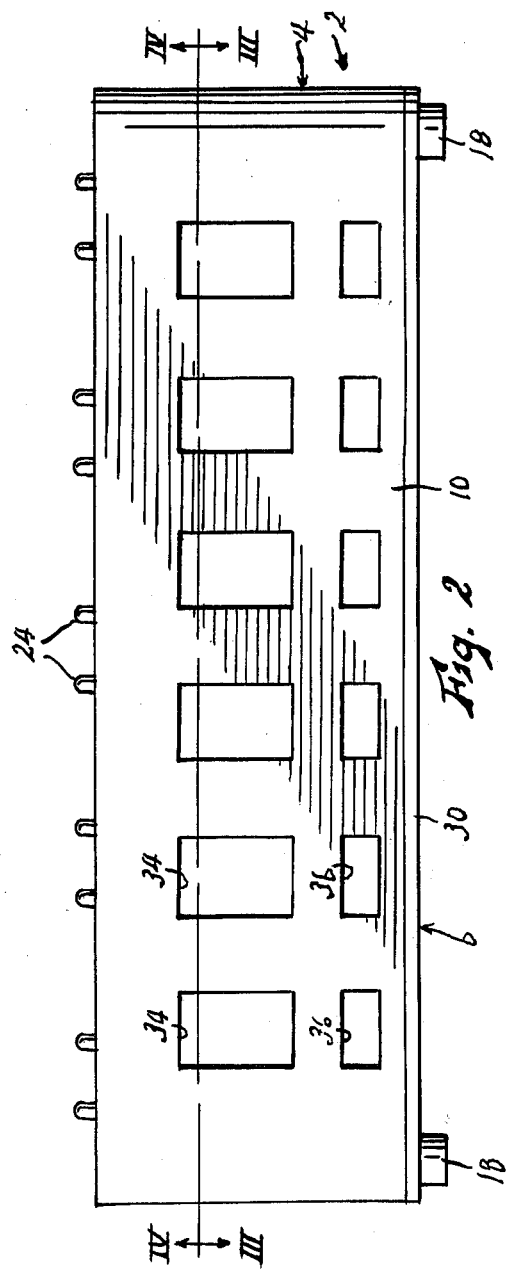

POULTRY INCUBATION AND HATCHING TRAY

This invention relates to new and useful improvements in poultry processing equipment, and has particular reference to trays in which poultry eggs are incubated and hatched.

In presently accepted practice, fertile eggs are commonly placed in trays which are suitably compartmented to hold each egg in a position with its major axis substantially vertical, with its larger end up, this being the end thereof holding the internal air sac. The trays, or assembled stacks of said trays, are then placed in an incubator cabinet in which air of suitable volume, temperature and humidity is constantly circulated, and tilted slowly about a horizontal axis so that the major axes of the eggs rock perhaps 60 degrees to alternately opposite sides of vertical. Most commonly, the eggs remain stationary in a "dwell" at each extreme of the tilting motion, and require about one hour to complete one full cycle. During this time incubation, or development of the embryos within the egg shells, proceeds normally. It is commonly accepted that this attitude and motion of the eggs is optimally conductive to the best embryo development, and the motion also reduces any adhesions between the embryos and the interior walls of the shells. This motion is continued for perhaps eighteen or nineteen days of the full twenty-one day incubation and hatching cycle. The eggs are then removed from the incubator trays and placed in hatching trays in which each egg lies on its side, and has a certain degree of free rolling movement. The hatching trays are then placed in the warm air cabinet, although tilting thereof as in the incubation period is no longer required. Hatching of the eggs, or emergence of the chicks from the shells, occurs during the next two or three days, and the chicks may then be removed for further processing. The hatching position, with each egg lying on its side, is commonly accepted as the most conductive to efficient hatching, and the freedom of the egg to shift or roll at least to some slight degree appears to contribute to the ease and facility with which the chicks may fracture the shell by pecking to emerge therefrom.

Commonly, the removal of the incubator trays from the warm-air cabinet, the transfer of the eggs from incubator to hatching trays, and the return of the hatching trays to the cabinet, have always been manual operations, which have been extemely time consuming in view of the many thousands of eggs normally being processed at one time, and therefore expensive from the viewpoint of labor costs.

The primary object of the present invention, therefore, is the provision of a tray which renders these three operations completely unnecessary, in that the tray functions to hold the eggs continuously throughout both the incubation and also the hatching periods, the eggs being shifted from the vertical-axis incubation position to the horizontal-axis hatching position simply by inversion of the tray. Generally, this object is accomplished by the provision of a tray having both a body portion and a removable cover, the trays being stackable in a vertical pile, the cover and the floor of the next lower tray providing guides for supporting each egg in a vertical axis position when the trays are turned to a position with their covers lowermost, and the inner surface of each tray floor being compartmented to hold each egg loosely in a horizontal-axis position when the trays are inverted to a position with their covers uppermost.

Another object is the provision of a tray of the character described in which the various egg guides and partitions are arranged so as to provide each egg with its own individual compartment at all times, so as to avoid any contact between the possible cracking of the shells, even during the inverting movement of the trays, while at the same time permitting free circulation of warm air around all of the eggs.

Other objects are simplicity and economy of construction, efficiency and dependability of operation, and ease and convenience of use.

Figure 4:
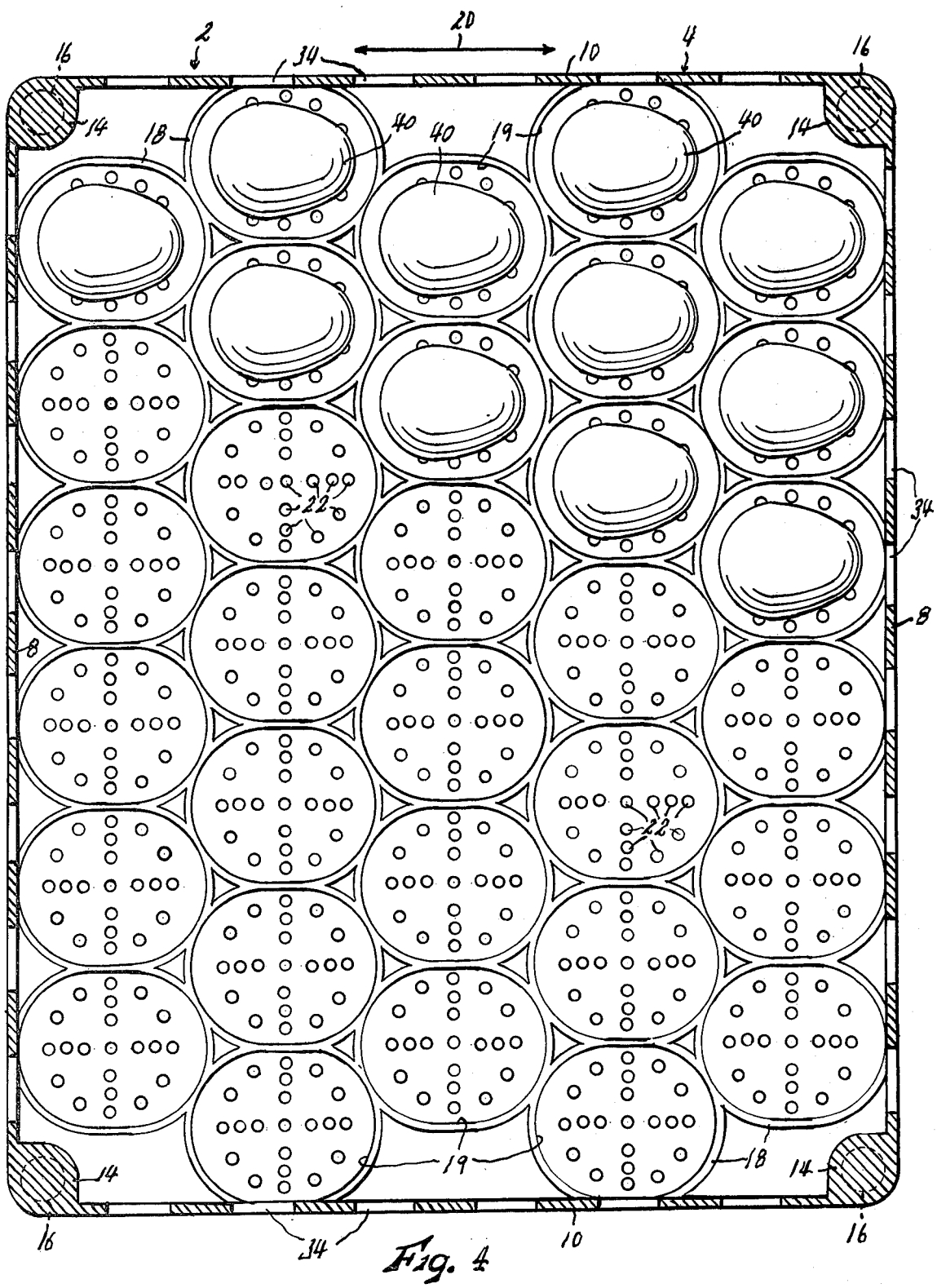
Figure 5:
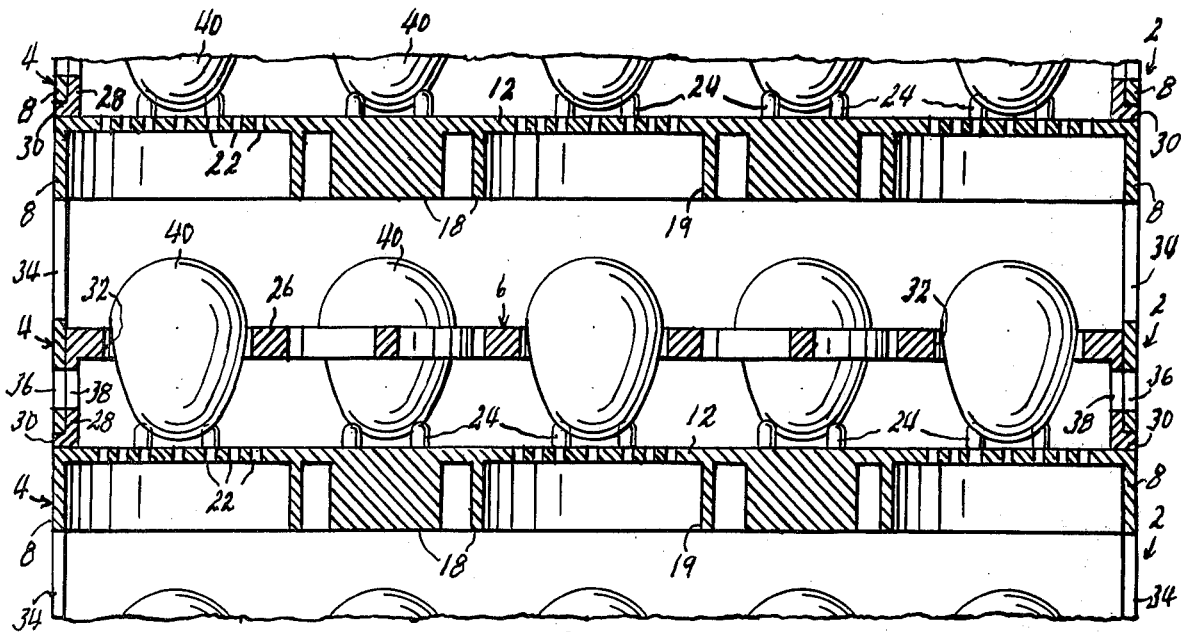
Figure 6:
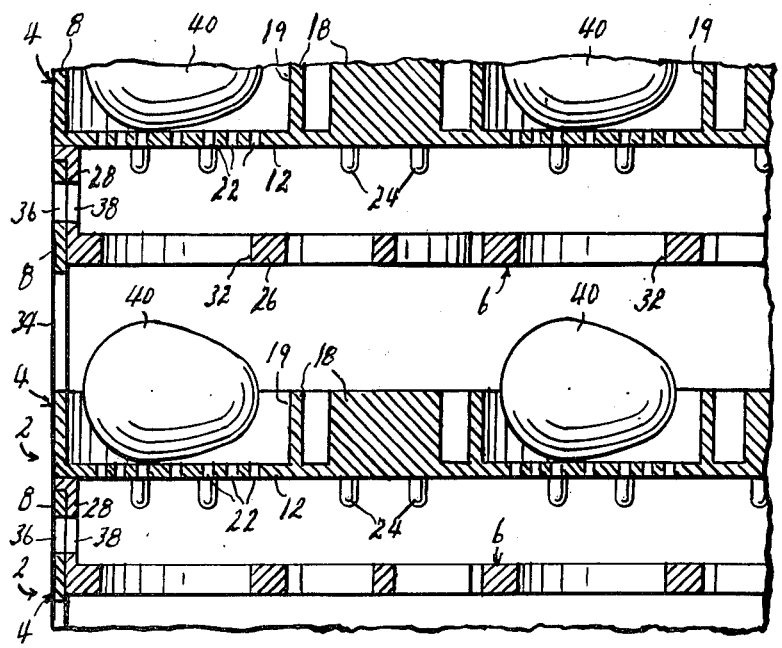
Figure 7:
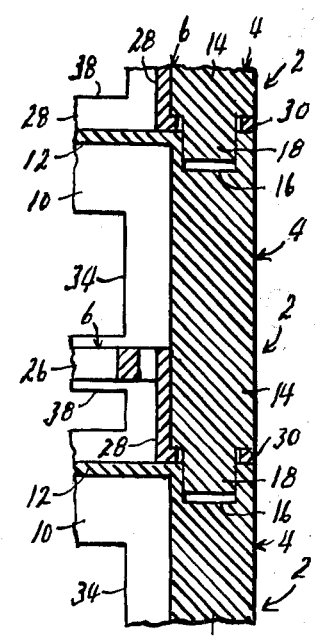

With these objects in view, as well as other objects which will appear in the course of the specification, reference will be had to the accompanying drawing, wherein:

FIG. 1 is a side elevational view of a poultry incubation and hatching tray embodying the present invention, shown in its incubation position, FIG. 2 is an end elevational view of the tray as shown in FIG. 1, FIG. 3 is a sectional view taken on line III—III of FIG. 2, showing the tray partially filled with eggs, FIG. 4 is a sectional view taken on line IV—IV of FIG. 2, with the tray inverted to its hatching position, FIG. 5 is a sectional view taken on line V—V of FIG. 3, showing the relationship of the tray to identical trays disposed above and below it in a stack of trays, FIG. 6 is a fragmentary view similar to FIG. 5, but showing the trays inverted to their hatching position, and FIG. 7 is a fragmentary sectional view taken on line VII—VII of FIG. 3.

Like reference numerals apply to similar parts throughout the several views, and the numeral 2 applies generally to a poultry incubation and hatching tray embodying the present invention. FIGS. 1, 2, 3, 5 and 7 show the tray in its incubation position, and for convenience it will be described as if this were its upright position, although it is inverted to a hatching position, as shown in FIGS. 4 and 6, during one period of its usage. The tray may be formed of metal, plastic or any other suitable material, and consists of a body member 4 and a cover 6. Body member 4 is rectangular as shown, having vertical side walls 8, end walls 10, and a horizontal top wall or "floor" 12. Each corner of said body member is thickened to provide an integral corner post 14, for stacking strength when the trays are stacked. Each corner post is provided at its upper end with a socket 16 (see FIG. 7), and at its lower end with a reduced depending pin 18 for engaging in the corresponding socket 16 of the next lower tray body, in order to align the trays firmly in stacked relation. Formed integrally on the lower surface of top wall 12 are depending partition walls 18 defining a large number of generally oval compartments 19 therebetween. Each compartment 19 has major and minor horizontal dimensions somewhat larger than the major and minor dimensions of the largest eggs to be handled. As shown in FIG. 4, the compartments cover nearly the entire area of the tray, and are staggered in successive rows in order to accomodate the greatest possible number of compartments. As will appear, the tray will be tilted on a horizontal axis parallel to its major dimension, moving in the direction of double arrow 20 in FIGS. 3 and 4, and the major dimension of each compartment extends across the minor dimension of the tray. Top wall 12 has perforations 22 formed therethrough for the free circulation of air. Formed integrally with top wall 12 at the top side thereof, and centered over each compartment 19, are four short upright fingers 24 having rounded upper ends, as best shown in FIGS. 3, 5 and 6. These fingers support the smaller end of an egg, as will appear. Partition walls 18 and perforations 22 are omitted from FIG. 3 in the interests of clarity.

Cover 6 of each tray includes a horizontal wall 26 spaced apart below top wall 12, but above the lower edges of the side and end walls of the tray body. Around its entire periphery it is provided with an integral depending skirt 28 which rests slidably against the interior surfaces of the side and end walls of the tray body, and is provided at its lower edge with an outturned flange 30 against which the lower edges of the side and end walls of the tray body may rest. Skirt 28 is offset inwardly at the tray corners to encompass the corner posts 14 of the tray body, as shown in FIG. 3. Flange 30 is perforated at each of the corners of the tray, as shown in FIG. 7, to receive the positioning pins 18 of the next higher tray in the stack. Formed in horizontal wall 26 of the cover are a series of circular openings 32, best shown in FIG. 3. Each of said openings is of a diameter slightly greater than the diameter (minor dimension) of an egg to be handled, and is centered over one of the sets of four fingers 24 carried by the top wall 12 of the next lower tray in the stack of trays, and also centered below the corresponding compartment 19 of its own tray body. Intermediate the areas of openings 32, wall 26 is of open-work form to provide for free circulation of air therethrough. Top wall 12 is spaced above wall 26 by a distance at least slightly greater than the length of the largest eggs to be handled, and the lower edges of partitions 18 forming compartments 19 are spaced above wall 26 by a distance at least slightly less than the diameter of the smallest eggs to be handled. Also for providing free circulation of air throughout the trays, slots 34 are formed through the side and end walls of the tray body around the periphery thereof, above the level of cover wall 26, and matching slots 36–38 are formed through the side and end walls of the tray body, and through skirt 28 of the cover, below the level of cover wall 26.

In use, the trays may be shipped to an egg producing farm, and there assembled in stacks, building from the bottom up, adding covers 6 and tray bodies 4 alternately to the stack. After each tray cover 6 is added, but before it is enveloped by the tray body above, an egg 40 is inserted, with its major axis vertical, into each of the circular openings 32 of wall 26 of the cover, with the larger end of the egg uppermost, and its smaller end supported and centered by the four fingers 24 projecting upwardly from the top wall of the next lower tray, as shown in FIG. 5. The diameter of opening 32 is sufficiently confining to prevent appreciable tilting of the egg, and wall 26 should be spaced sufficiently above fingers 24 to rise to the maximum diameter or "waist" of the egg. Fingers 24 center the lower end of the egg below its corresponding opening 32, and prevent it from slipping or sliding on top wall 12. The trays may be assembled in a suitable tray holder, in itself not pertinent to the present invention, adapted to contain a number of trays suitable in size for convenient shipment, or may be inserted into such a tray holder after assembly, and then transported to an egg processing plant. At the plant, the tray holders are inserted and sealed in an incubator cabinet within which air of the desired quantity, temperature and humidity is constantly circulated. Thorough circulation of air throughout the trays, and around all of the eggs contained therein, is guaranteed by the described openings in all six surfaces of the generally rectilinear form of the trays. Up until this time, care should have been exercised to maintain the trays in the upright position shown in FIGS. 1, 2, 3, 5 and 7, so that the eggs are supported in openings 32 of wall 26 by fingers 24 of wall 12.

The trays are then rythmically tilted in the incubator cabinet by power means not in itself pertinent to the present invention, tilting the axes of the eggs about 60 degrees either side of vertical. Commonly a full cycle of about one hour is used, with perhaps a ten minute dwell at each extreme of the tilting motion. This motion of the eggs, with the larger ends thereof containing the air sacs uppermost, has been found, and is commonly accepted to be, the most conducive to the best development of the embryos, and to prevent adhesions of the embryos to the interior surfaces of the egg shells. During the tilting cycle, which is continued for about eighteen or nineteen days of the total twenty-one day incubation and hatching cycle, the eggs are maintained in substantially fixed relation to the tray, since they fit sufficiently closely in openings 32 of wall 26 to prevent any appreciable relative movement therebetween, and since their smaller lower ends are supported and prevented from slipping or sliding along wall 12 by fingers 24.

After the eighteen or nineteen day incubation period, the tray tilting mechanism is computer actuated to arrest the tilting motion with the trays in a horizontal position, and then further actuated to completely invert the trays to the position shown in FIGS. 4 and 6, at the same slow speed at which they have previously been tilted. During this inversion, each egg is dropped from its opening 32 of wall 26 into the corresponding compartment 19 formed by partitions 18 of wall 12, said compartments then opening upwardly. The compartments are of sufficient size that the eggs then lie on their sides, also as shown in FIGS. 4 and 6, and are free to move or roll freely to some degree on wall 12, in response to the pecking of the chicks as they break the shells to emerge therefrom in the hatching process. This position of the eggs, with the described freedom of movement, is commonly accepted as the most conducive to efficient hatching. After two or three days, all of the chicks should be hatched. During the movement of inversion of the trays, complete emergence of each egg from its opening 32 is guaranteed by the fact that walls 12 and 26 are spaced apart by a distance greater than the length of the egg. At the same time, no egg can contact or fall against any other egg, since it cannot pass between wall 26 and upper edges of partitions 18 due to the fact that the space between these members is less than the diameter of the egg. In other words, each compartment 19 of wall 12, together with the associated opening 32 of wall 26 and set to fingers 24, form an individual compartment for each egg, from which the egg cannot escape. Otherwise, the eggs might all fall to one side of the tray at the 90 degree position of the inverting movement, which would cause cracking of many of the shells. Such cracking would be fatal to the chicks, and cannot be permitted. Actually, there is a time period, at the 90 degree position of inversion, and when each egg is supported between wall 26 and an edge of one of partitions 18, when the egg may project laterally from its own individual compartment to some slight degree. However, it still cannot contact an egg in any adjoining compartment, since the egg in such adjacent compartment will then have fallen to the opposite side of its own compartment, well apart from the first egg. If the egg rows are staggered in lines parallel to the tilting axis of inversion, as indicated in FIGS. 3 and 4, there can be no contact between the various eggs at any time. If for any reason further confinement of the eggs during inversion is deemed necessary or desirable, the height of partitions 18 could be increased to some extent, although free circulation of air around the eggs should not be inhibited. If the movement of inversion is very slow, as described, the eggs will not be "thrown about" forcibly enough to risk cracking of their shells on contact with portions of the tray itself. In fact, they will substantially "roll" gently from the FIG. 5 position to the FIG. 6 position, passing first from the FIG. 5 position to an intermediate position in which each egg is supported by wall 26 and an edge of one of partitions 18, which normally occurs after the tray has passed 90 degrees of inversion, and then to the FIG. 6 position as the tray approaches total inversion. Some gravity movement of the eggs does in fact occur, particularly as they emerge from opening 32, but much of this movement is accomplished by gradual sliding, not in free fall, and in any event is so short as to create no problem of crackage of the shells.

After hatching is complete, the trays, still stacked in the inverted position of FIG. 6, may be removed from the cabinet, and the tray stacks disassembled from the top down. As each tray cover 6 is removed, the chicks then supported on wall 12 are exposed, and may be removed for further processing. The side and end walls 8 and 10 of the tray body are of sufficient height to confine the chicks until they can be removed. A wall height of 3½ to 4 inches is generally considered adequate for this purpose. The shells may then be dumped, and the trays thoroughly washed and sterilized for return to the egg producing farm.

While I have shown and described a specific embodiment of my invention, it will be readily apparent that many minor changes of structure and operation could be made without departing from the spirit of the invention.

What I claim as new and desire to protect by Letters Patent is:

1. A poultry incubation and hatching tray adapted to be tiltably inverted from a horizontal incubation position to a horizontal hatching position, and to be tilted, alternately in opposite directions from horizontal when in its incubation position, and to be stacked with other identical trays, said tray comprising:
   a. a body member having, when in its hatching position, a horizontal floor and upstanding side and end walls,
   b. a cover member releasably joined to said body member and having a wall parallel to but spaced apart from the floor of said body member, and
   c. egg support members formed by special configurations of said body member and cover to constitute a series of individual compartments each operable to contain a single poultry egg, each of said compartments being configurated, when the tray is in its incubation position, to maintain its associated egg in a position with its axis substantially vertical, and substantially stationary relative to said tray, and when the tray is inverted to its hatching position, to allow said egg to move by gravity to a position lying on its side on said floor, with a degree of free rolling movement on said floor.

2. A tray as recited in claim 1 wherein said tray body and cover are of open-work form whereby to permit free circulation of air around said eggs.

3. A tray as recited in claim 1 wherein the wall of said cover parallel to said body floor, when the tray is in its incubation position, is spaced above the lower edges of the side and end walls of the tray body, but below the tray floor, and wherein one element of the special configuration contributing to the formation of each of said egg compartments comprises a circular opening formed in said cover wall and operable to receive an egg therein to support said egg with its axis substantially vertical.

4. A tray as recited in claim 3 wherein said opening of said cover wall is of slightly larger diameter than said egg, whereby said egg may pass therethrough, and wherein the lower end of said egg, is supported, when said trays are stacked, on the top surface of the floor of the next lower tray of the stack.

5. A tray as recited in claim 4 with the addition of a plurality of upward projections carried by the floor of the next lower tray in a stack of said trays beneath each of the openings of said cover wall, said projections being operable to engage the lower end of the associated egg therebetween to prevent it from sliding laterally along said floor.

6. A tray as recited in claim 3 wherein the vertical spacing between said body floor and said cover wall is greater thn the length of an egg to be carried in said tray.

7. A tray as recited in claim 3 wherein another element of the special configuration contributing to the formation of each of said egg compartments comprises vertical partition walls depending from the tray floor, when said tray is in its incubation position, and forming with said tray floor a compartment operable to receive the associated egg therein when said tray is inverted to its hatching position.

8. A tray as recited in claim 7 wherein each compartment formed by said floor and partitions is generally oval in horizontal form, having major and minor dimensions respectively greater than the length and diameter of the associated egg, whereby said egg, when said tray is inverted to its hatching position, will be on its side within said compartment and may roll freely to a limited extent on the tray body floor.

9. A tray as recited in claim 8 wherein the edges of said partition walls confronting said cover wall are spaced apart from said wall by a distance less than the diameter of an egg, whereby no egg may pass therebetween.

10. A tray as recited in claim 9 wherein said cover wall is spaced apart from said body floor by a distance greater than the length of an egg, whereby said egg will fall free from said cover wall opening when the tray is inverted to its hatching position.

11. A tray as recited in claim 10 wherein each of the openings of said cover wall is of slightly greater diameter than that of an egg, whereby the associated egg may be freely inserted therein, and will fall freely therefrom when the tray is inverted, and wherein the lower end of said egg is supported in its incubation position, when the trays are stacked, by the floor of the next lower tray in the stack.

* * * * *